United States Patent
Kamiyama et al.

(10) Patent No.: US 6,612,163 B2
(45) Date of Patent: Sep. 2, 2003

(54) DEVICE FOR TESTING TRANSAXLE

(75) Inventors: Toshifumi Kamiyama, Kawasaki (JP); Masayuki Egami, Gunma (JP); Akira Yamamoto, Gunma (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 09/891,376

(22) Filed: Jun. 27, 2001

(65) Prior Publication Data
US 2001/0054321 A1 Dec. 27, 2001

(30) Foreign Application Priority Data
Jun. 27, 2000 (JP) .................................. 2000-192283

(51) Int. Cl.$^7$ .............................. G01M 19/00; G01L 5/28
(52) U.S. Cl. ................................... 73/118.1; 73/119 R
(58) Field of Search .................... 73/118.1, 119 R, 73/862.191

(56) References Cited

U.S. PATENT DOCUMENTS

| | | | | |
|---|---|---|---|---|
| 4,454,426 A | * | 6/1984 | Benson | 290/1 R |
| 4,489,597 A | * | 12/1984 | Davison, Jr. | 73/118.1 |
| 4,520,659 A | * | 6/1985 | Lucia et al. | 73/118.1 |
| 4,814,650 A | * | 3/1989 | Curwen et al. | 310/22 |
| 5,093,596 A | * | 3/1992 | Hammer | 310/112 |
| 5,168,186 A | * | 12/1992 | Yashiro | 310/47 |
| 5,189,908 A | * | 3/1993 | Sano et al. | 73/118.1 |
| 5,209,110 A | * | 5/1993 | Sano et al. | 73/118.1 |
| 5,477,740 A | * | 12/1995 | Shioya et al. | 73/862.191 |

FOREIGN PATENT DOCUMENTS

| | | |
|---|---|---|
| JP | 8-338789 | 12/1996 |
| JP | 11-94702 | 4/1999 |

* cited by examiner

*Primary Examiner*—Edward Lefkowitz
*Assistant Examiner*—Lilybett Martir
(74) *Attorney, Agent, or Firm*—Foley & Lardner

(57) ABSTRACT

A device for testing a transaxle is constructed such that a drive motor is coupled with an input shaft of the transaxle through an input-shaft torque meter, and dynamometers are coupled with output shafts of the transaxle through axle shafts and output-shaft torque meters, respectively.

12 Claims, 5 Drawing Sheets

DEVICE FOR TESTING TRANSAXLE

BACKGROUND OF THE INVENTION

The present invention relates to a device for testing a transaxle for a motor vehicle.

A typical device for testing a transaxle which is a speed change gear for FWD vehicles or FWD 4WD vehicles comprises a mount on which a transaxle as test piece is placed and a drive motor coupled with an input shaft of the transaxle through input-shaft torque meter and a gear. Axle shafts are coupled with right and left output shafts of the transaxle, and dynamometers as power absorbing parts are coupled with the axle shafts through output-shaft torque meters. The device also comprises a bed on which one output-shaft torque meter and dynamometer are mounted, and another bed on which another output-shaft torque meter and dynamometer are mounted.

When rotating the drive motor, the transaxle is driven through the gear and the input-shaft torque meter, which is transmitted to the dynamometers through the axle shafts and the output-shaft torque meters, achieving power absorption.

In the transaxle testing device as described above, the transaxle incorporates a differential gear with small distance between input and output shafts, so that coupling between the input shaft of the transaxle and the drive motor cannot be carried out directly, and thus through the gear.

The need of the gear results in an increase in required space and weight of the device. Moreover, the gear produces vibration and noise, and calls for cooling water and a power supply for circulation thereof. Furthermore, a control error can occur due to occurrence of a nonlinear element through backlash of the gear. Further, the maintenance is needed for cooling water and lubricating oil for the gear.

SUMMARY OF THE INVENTION

It is, therefore, an object of the present invention to provide a device for testing a transaxle, which contributes to a reduction in required space and weight, elimination of accessory apparatus, restraint of vibration, noise and control error, and facilitation of the maintenance.

The present invention generally provides a device for testing a transaxle with an input shaft and two output shafts, comprising:
 a mount on which the transaxle is mounted;
 a first torque meter having one end coupled with the input shaft of the transaxle;
 a drive motor coupled with another end of the first torque meter;
 axle shafts coupled with the respective output shafts of the transaxle;
 second torque meters each having one end coupled with the corresponding axle shaft; and
 power absorbing parts each coupled with another end of the corresponding second torque meter.

One aspect of the present invention is to provide an arrangement, comprising;
 a transaxle with an input shaft and two output shafts;
 a mount on which the transaxle is mounted;
 a first torque meter having one end coupled with the input shaft of the transaxle;
 a drive motor coupled with another end of the first torque meter;
 axle shafts coupled with the respective output shafts of the transaxle;
 second torque meters each having one end coupled with the corresponding axle shaft; and
 power absorbing parts each coupled with another end of the corresponding second torque meter.

BRIEF DESCRIPTION OF THE DRAWINGS

The other objects and features of the present invention will become apparent from the following description with reference to the drawings wherein.

DETAILED DESCRIPTION OF THE INVENTION

Figure 1:
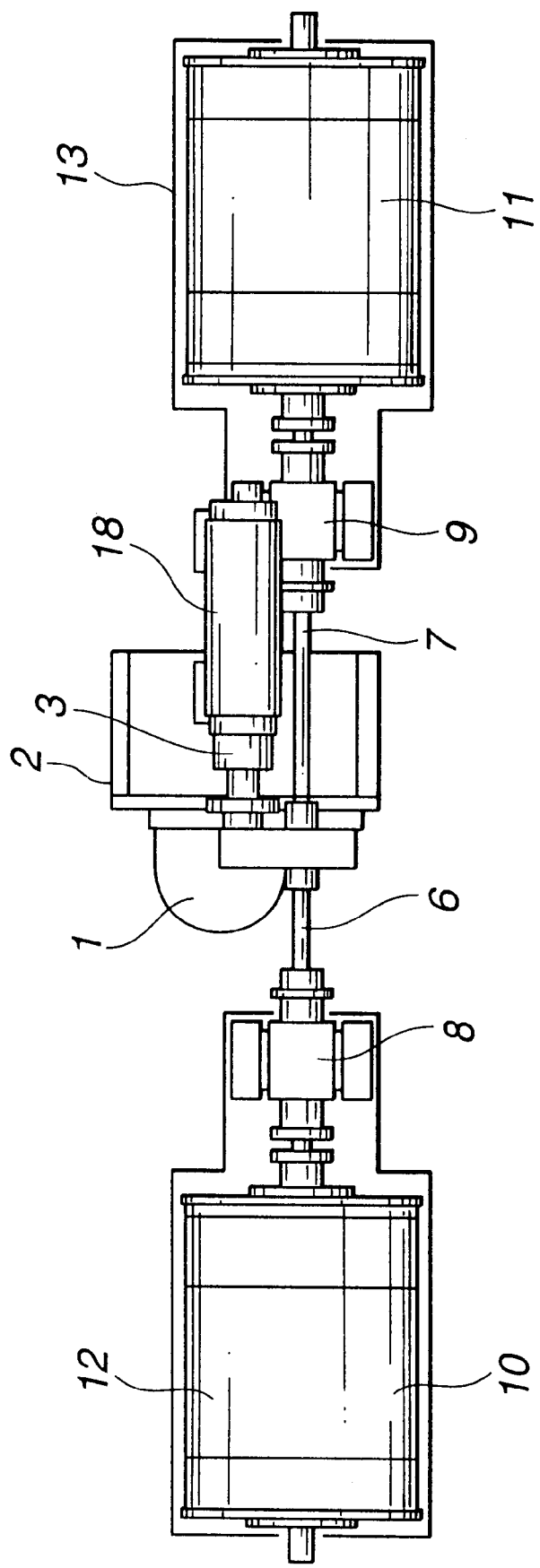
FIG. 1 is a plan view showing an embodiment of a device for testing a transaxle according to the present invention.

Referring to the drawings, a device for testing a transaxle embodying the present invention will be described. Referring to FIG. 1, in the device, a transaxle 1 has an input shaft with which a drive motor 18 is coupled through an input-shaft or first torque meter 3. The torque motor 3 is integrated with a mount 2. The drive motor 18 is of the permanent magnet type with small outer diameter. Output shafts of the transaxle 1 are coupled with dynamometers 10, 11 through axle shafts 6, 7 and output-shaft or second torque meters 8, 9, respectively. There are arranged a first bed 12 on which the second torque meter 8 and the dynometer 10 are mounted, and a second bed 13 on which the second torque meter 9 and the dynometer are mounted. The drive motor 18 is interposed between the mount 2 on which the transaxle 1 is mounted and the dynamometer 11. The length of the axle shaft 7 is determined to allow such arrangement of the drive motor 18. Specifically, the length of the axle shaft 7 is increased up to a point so as not to positionally overlap the drive motor 18 and the dynamometer 11 one another. Moreover, the drive motor 18 is aligned with an axis of the input shaft of the transaxle 1, whereas the dynamometers 10, 11 are aligned with respective axes of the output shafts of the transaxle 1.

Figure 2:
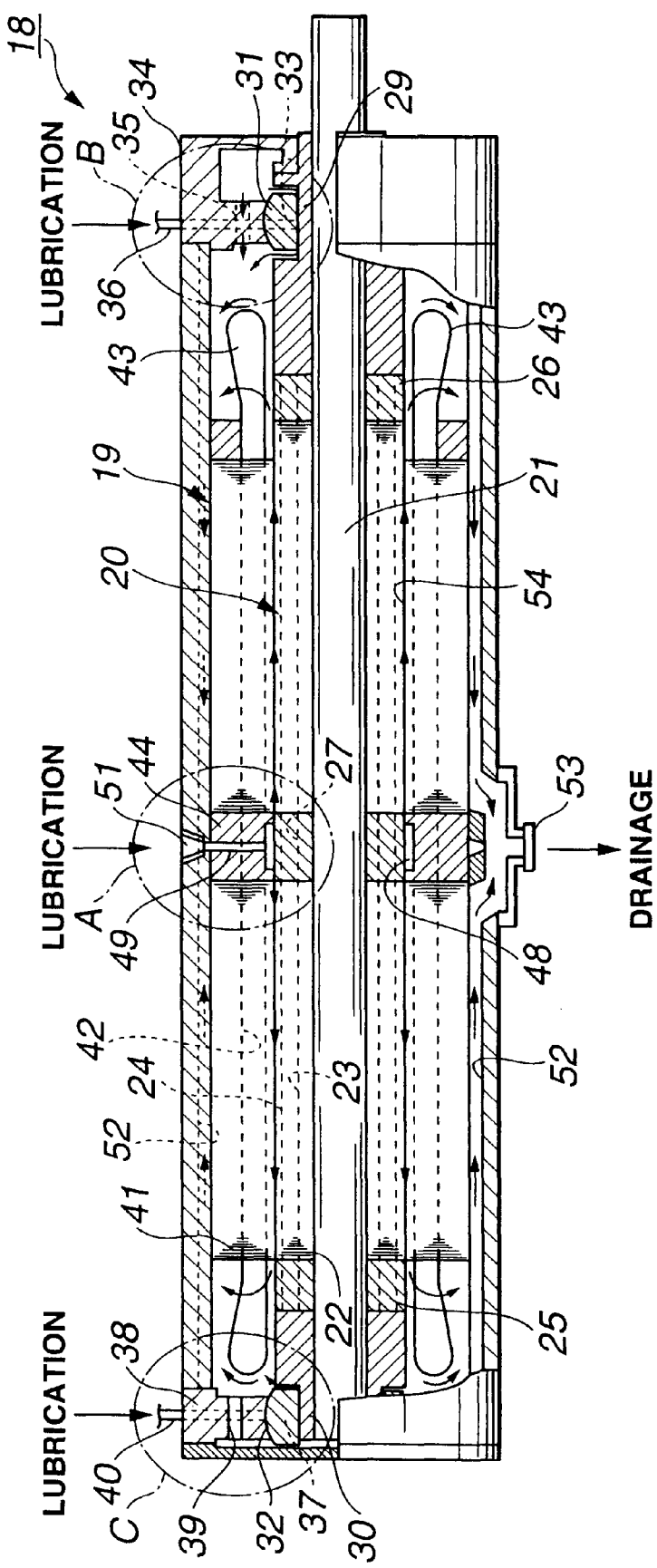
FIG. 2 is a sectional view showing a drive motor.
Figure 3:
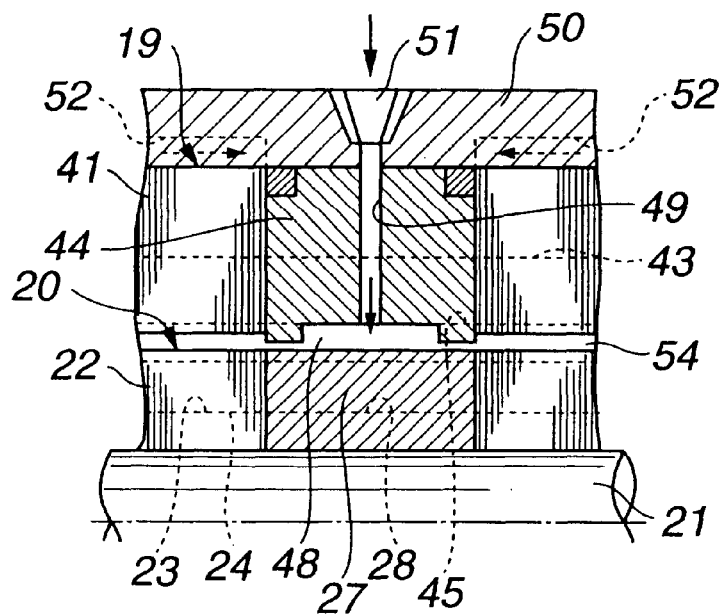
FIG. 3 is an enlarged view showing an encircled portion A in FIG. 2.
Figure 4:
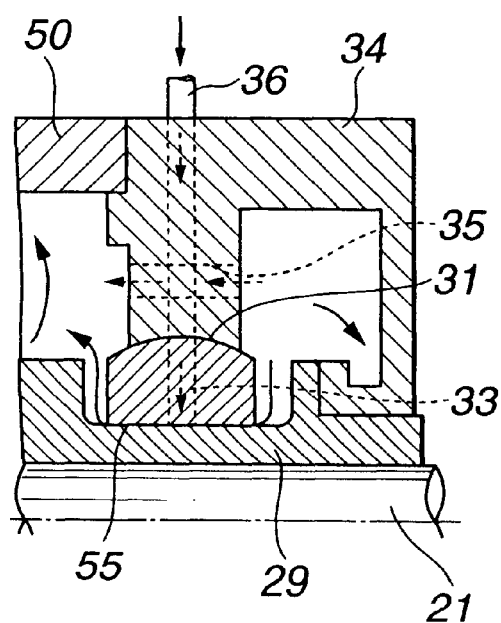
FIG. 4 is a view similar to FIG. 3, showing an encircled portion B in FIG. 2.
Figure 5:
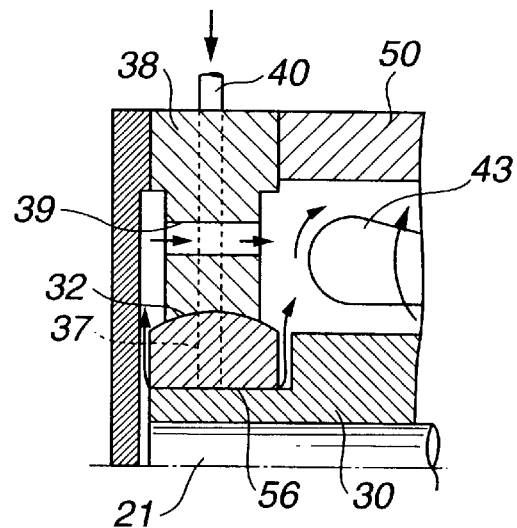
FIG. 5 is a view similar to FIG. 4, showing an encircled portion C in FIG. 2.

Referring to FIGS. 2–5, the drive motor 18 is of the three-phase induction type, and comprises a stator 19 and a rotor 20. The rotor 20 includes a cage rotor wherein a rotor bar 24 is arranged through a slot or through hole 23 of a laminating rotor core 22 secured to a rotation shaft 21, and has both ends short-circuited by end rings 25, 26. As best seen in FIG. 3, a hydrostatic-bearing journal 27 of the same diameter as the rotor core 22 is coaxially arranged in an axially middle portion of the rotor core 22. The rotor bar 24 is also arranged through a slot or through hole 28 of the hydrostatic-bearing journal 27. As best seen in FIGS. 4–5, hydrostatic-bearing journals 29, 30 are also arranged at both axial ends of the rotation shaft 21, through which the axial ends of the rotation shaft 21 are rotatably supported by a direct-coupling side hydrostatic bearing 31 and a counter-direct-coupling side hydrostatic bearing 32.

The direct-coupling side hydrostatic bearing 31 is formed with a radial passage 33 running from the outer periphery to the inner periphery. A direct-coupling side bracket 34 is formed with an axial passage 35 running from the outside to the inside, and a lubrication hole 36 communicating with the passage 33 of the direct-coupling side hydrostatic bearing 31. The counter-direct-coupling side hydrostatic bearing 32 is formed with a radial passage 37 running from the outer periphery to the inner periphery. A counter-direct-coupling side bracket 38 is formed with an axial passage 39 running from the outside to the inside, and a lubrication hole 40 communicating with the passage 37 of the counter-direct-coupling side hydrostatic bearing 37.

As shown in FIG. 2, the stator 19 is constructed such that a stator coil 43 is engaged with an open slot 42 of a laminating stator core 41. A middle hydrostatic bearing 44 is arranged in an axially middle portion of the stator core 41 to rotatably support the axial middle portion of the rotor 20. As shown in FIG. 3, the middle hydrostatic bearing 44 is formed with an open slot 45 with which the stator coil 43 is engaged also. The middle hydrostatic bearing 44 and the hydraulic-bearing journal 27 are formed of a non-magnetic material.

Figure 6:
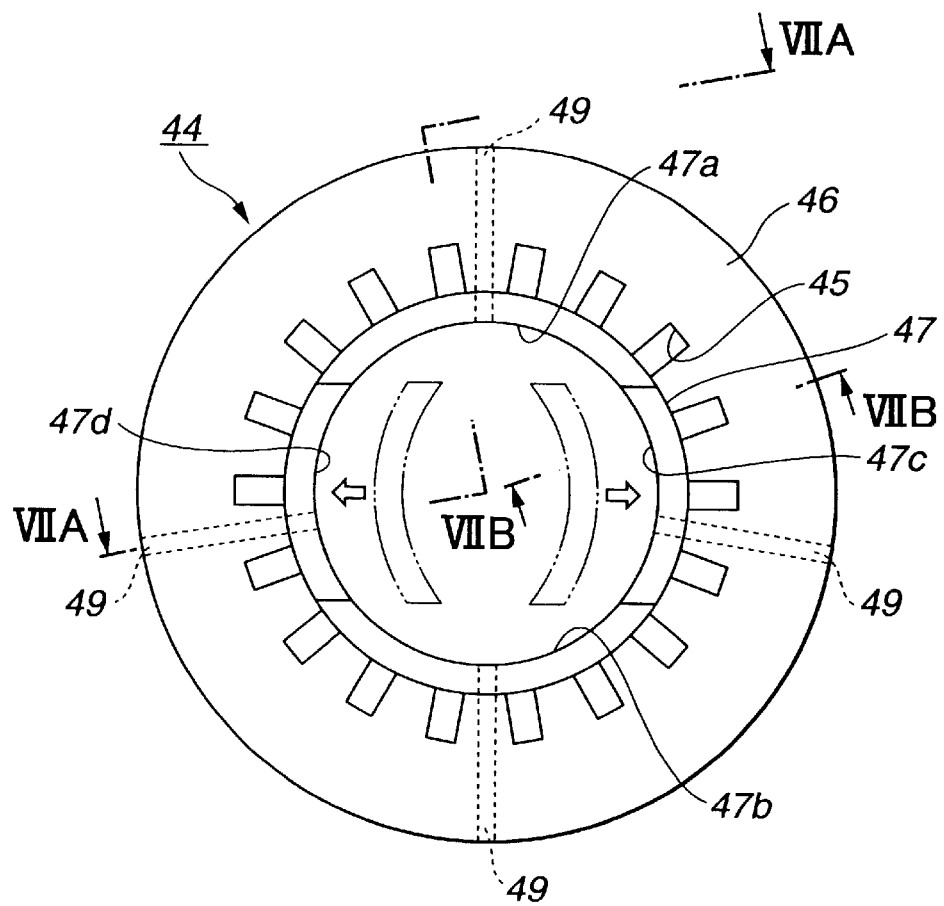
FIG. 6 is a front view showing a middle hydrostatic bearing.
Figure 7A:
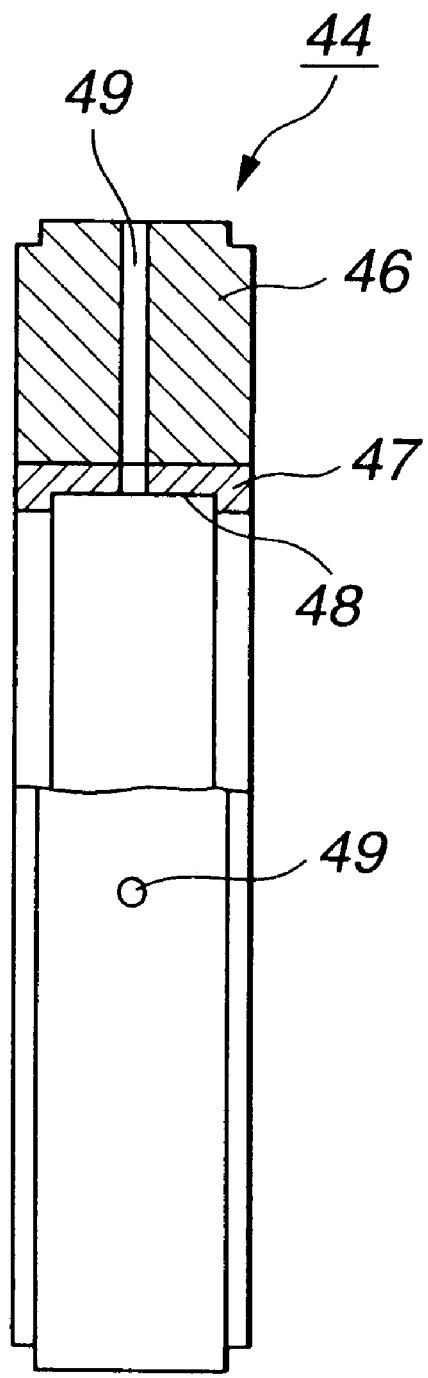
FIGS. 7A–7B are views similar to FIG. 2, taken along the line VIIA-VIIA and the line VIIB-VIIB, respectively.
Figure 7B:
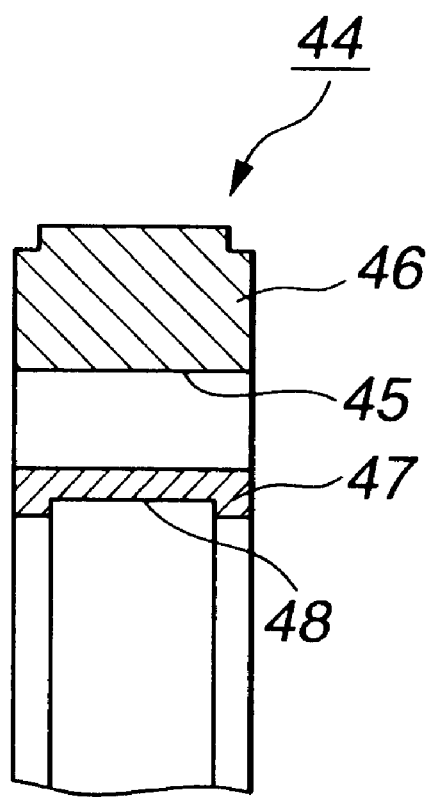

Referring FIGS. 6–7B, the middle hydrostatic bearing 44 comprises two divided portions, i.e. an outer ring or back plate 46 and an inner ring or bearing bush 47. The open slot 45 is formed in the inner periphery of the outer ring 46. The inner ring 47, which includes four circumferentially divided segments 47a–47d, is mounted to the stator core 41 from the inside. Specifically, when mounting the inner ring 47 to the outer ring 46, the stator coil 43 is engaged with the open slots 42, 45 of the stator core 41 and the outer ring 46. Subsequently, the segments 47a, 47b are mounted to the stator core 41, then the segments 47c, 47d are mounted thereto from the inside. A hydraulic pocket 48 is formed in an inner peripheral surface of the inner ring 47. The adjacent segments 47a–47d of the inner ring 47, and the inner and outer ring 47, 46 are joined with a resin when impregnating it with the stator coil 43 engaged with the open slots 42, 45. The middle hydrostatic bearing 44 is formed with four radial passages 49 running from the outer periphery to the inner periphery. Each passage 49 communicates with a lubricating port 51 formed in a frame 50.

Lubricating-oil return passages 52 are axially formed between the inner periphery of the frame 50 and the outer periphery of the stator core 41 so as to communicate with a drain port 53 formed in the frame 50. As shown in FIG. 3, both ends of the hydraulic pocket 48 formed in the inner peripheral surface of the middle hydrostatic bearing 44 slightly protrude from an inner peripheral surface of the stator core 41 to the rotor 20. At those points, a gap 54 between the stator 19 and the rotor 20 becomes the narrowest, preserving the static pressure. Preferably, a clearance of the middle hydrostatic bearing 44 is larger than clearances 55, 56 of the hydrostatic bearings 31, 32. The reason is such that by making the passage resistance of the middle hydrostatic bearing 44 smaller than that of the hydrostatic bearing 31, 32, greater amount of lubricating or pressure oil is supplied to the middle hydrostatic bearing 44 to secure a flow rate required for cooling of the device.

With the above constitution, when rotating the drive motor 18, the transaxle 1 is driven through the torque meter 3, which is transmitted to the dynamometers 10, 11 through the axle shafts 6, 7 and the torque meters 8, 9, achieving power absorption. Lubricating oil is provided to the hydrostatic bearings 31, 32, 44 from an external pump. Lubricating oil for the hydrostatic bearing 31 is introduced from the lubrication hole 36, and is provided from the outer periphery to the inner periphery through the passage 33. Then, it is diverted to circumferentially flow through the clearance 55 between the hydrostatic bearing 31 and the hydrostatic-bearing journal 29 in the axially opposite directions with respect to the passage 33, wherein one part of lubricating oil flows to an end of the stator coil 43, and another part also flows to the end of the stator coil 43 through the passage 35.

Lubricating oil for the hydrostatic bearing 32 is introduced from the lubrication hole 40, and is provided from the outer periphery to the inner periphery through the passage 37. Then, it is diverted to circumferentially flow through the clearance 56 between the hydrostatic bearing 32 and the hydrostatic-bearing journal 30 in the axially opposite directions with respect to the passage 37, wherein one part of lubricating oil flows to another end of the stator coil 43, and another part also flows to the another end of the stator coil 43 through the passage 39.

Lubricating oil for the middle hydrostatic bearing 44 is introduced from the lubrication hole 51, and is provided from the outer periphery to the inner periphery through the passage 49. Then, it is diverted to circumferentially flow through the gap 54 between the stator 19 and the rotor 20 in the axially opposite directions with respect to the passage 49, reaching the outer periphery of the stator core 41 through both ends of the stator coil 43. Moreover, lubricating oil provided to the hydrostatic bearings 31, 32, which join with lubricating oil provided to the middle hydrostatic bearing 44 at both ends of the stator coil 43, also reaches the outer periphery of the stator core 41 through both ends of the stator coil 43.

Then, passing through the return passage 52 between the inner periphery of the frame 50 and the outer periphery of the stator core 41, those lubricating oils flow into an axially middle portion of the drive motor 18 to join together for discharge to the outside through the drain hole 53. Discharged lubricating oil is cooled down in a cooling device, then supplied to the hydrostatic bearings 44, 31, 32 by the pump.

In the illustrative embodiment, the drive motor 18 is of the permanent magnet type with small outer diameter, obtaining reduced inertia value. This provides an engine-equivalent transient-characteristic evaluation as an alternative to an engine, allowing a simulation of the engine characteristic. Moreover, due to smaller diameter of the outer diameter of the drive motor 18, the drive motor 18 and the dynamometers 10, 11 are directly coupled with each other in alignment with the axes of the input and output shafts of the transaxle 1 without any gear arranged on the input or output side of the transaxle 1. This results in possible reduction in required space and weight of the device. Moreover, this allows elimination of cooling water for gear and a power supply for circulation thereof, leading to a cost reduction. Furthermore, it is possible to remove vibration and noise due to gear, and restrain a control error due to no presence of a nonlinear element through backlash of the gear. Further, the maintenance can be eliminated for cooling water and lubricating oil for the gear.

Still further, a reduction in size of the device can also be achieved by interposing the drive motor 18 between the mount 2 and the dynamometer 11, and by aligning the drive motor 18 with the axis of the input shaft of the transaxle 1, and the power absorbing part with the axis of the output shaft thereof. A size reduction of the device facilitates modification of layout in connection with tests for different type of transaxle 1. Moreover, smaller distance between the transaxle 1 and the drive motor 18 or the dynamometer 10, 11 enhances torsional resonance point, allowing operation with excellent transient response.

The use of the permanent magnet type drive motor 18 can reduce a motor loss, resulting in largely improved electric efficiency. Moreover, since the middle hydrostatic bearing 44 is arranged in the axially middle portion of the stator core 41 to rotatably support the axially middle portion of the rotor 20, the flexural rigidity of the rotor 20 is remarkably increased as compared with supporting the rotor 20 only by the hydrostatic bearings 31, 32 at both ends, allowing development of the critical velocity of the rotor 20. This results in possible shaping of the rotor 20 in elongated form, achieving further reduced inertia force and high-speed rotation.

Direct cooling of the drive motor 18 is ensure with lubricating oil in connection with the stator coil 43, the stator core 41, and the rotor core 22 as heat source, achieving higher cooling performance. Moreover, the stator coil 43, etc. can directly be cooled with whole lubricating oil provided with the middle hydrostatic bearing 44. Furthermore, the drive motor 18 is constructed such that lubricating oil flows from the axially middle portion to the axial end portions, then returns to the axially middle portion, having larger contact area with lubricating oil, resulting in enhanced cooling efficiency. Further, lubricating oil for the hydrostatic bearings 31, 32 is directed to the ends of the stator coil 43 so as to apply to direct cooling of the stator coil 43, etc., obtaining enhanced cooling performance of the device and simplified constitution of the cooling-oil or lubricating-oil system.

Having described the present invention with regard to the preferred embodiment, it is noted that the present invention is not limited thereto, and various changes and modifications can be made without departing from the scope of the present invention.

The entire contents of Japanese Patent Application 2000-192283 are incorporated herein by reference.

What is claimed is:

1. A device for testing a transaxle with an input shaft and two output shafts, comprising:
    a mount on which the transaxle is mounted;
    a first torque meter having one end coupled with the input shaft of the transaxle;
    a drive motor directly coupled with another end of the first torque meter;
    axle shafts coupled with the respective output shafts of the transaxle;
    second torque meters each having one end coupled with the corresponding axle shaft; and
    two power absorbing parts each directly coupled with another end of the corresponding second torque meter.

2. The device as claimed in claim 1, wherein the drive motor is a permanent magnet motor.

3. The device as claimed in claim 2, wherein the drive motor is interposed between the mount and one of the power absorbing parts, wherein the length of the axle shaft is determined to allow such an arrangement of the drive motor.

4. The device as claimed in claim 3, wherein the drive motor is aligned with an axis of the input shaft of the transaxle, and the power absorbing parts are aligned with respective axes of the output shafts of the transaxle.

5. The device as claimed in claim 4, wherein the drive motor comprises a rotor and bearings arranged in the axial direction of the drive motor, the bearings rotatably supporting two end portions and a middle portion of the rotor.

6. The device as claimed in claim 5, wherein the bearings comprise hydrostatic bearings.

7. An arrangement, comprising:
    a transaxle with an input shaft and two output shafts;
    a mount on which the transaxle is mounted;
    a first torque meter having one end coupled with the input shaft of the transaxle;
    a drive motor directly coupled with another end of the first torque meter;
    axle shafts coupled with the respective output shafts of the transaxle;
    second torque meters each having one end coupled with the corresponding axle shaft; and
    two power absorbing parts each directly coupled with another end of the corresponding second torque meter.

8. The arrangement as claimed in claim 7, wherein the drive motor is of a permanent magnet type.

9. The arrangement as claimed in claim 8, wherein the drive motor is interposed between the mount and one of the power absorbing parts, wherein the length of the axle shaft is determined to allow such an arrangement of the drive motor.

10. The arrangement as claimed in claim 9, wherein the drive motor is aligned with an axis of the input shaft of the transaxle, and the power absorbing parts are aligned with respective axes of the output shafts of the transaxle.

11. The arrangement as claimed in claim 10, wherein the drive motor comprises a rotor and bearings arranged in the axial direction of the drive motor, the bearings rotatably supporting two end portions and a middle portion of the rotor.

12. The arrangement as claimed in claim 11, wherein the bearings comprise hydrostatic bearings.

* * * * *